(12) United States Patent
Leung

(10) Patent No.: US 8,157,372 B1
(45) Date of Patent: Apr. 17, 2012

(54) LENS CONNECTION DEVICE FOR AN EYEWEAR

(76) Inventor: Yuet-Charn Leung, Hong Kong (CN)

( * ) Notice: Subject to any disclaimer, the term of this patent is extended or adjusted under 35 U.S.C. 154(b) by 0 days.

(21) Appl. No.: 13/066,311

(22) Filed: Apr. 12, 2011

(51) Int. Cl.
*G02C 1/02* (2006.01)

(52) U.S. Cl. ......................... 351/110; 351/124

(58) Field of Classification Search .................. 351/110, 351/124, 41, 158
See application file for complete search history.

(56) References Cited

U.S. PATENT DOCUMENTS

| | | | |
|---|---|---|---|
| 5,450,151 A | 9/1995 | Kobayashi | |
| 5,659,380 A | 8/1997 | Kobayashi | |
| 6,170,950 B1 | 1/2001 | Yoshida | |
| 6,776,482 B1 * | 8/2004 | Xiao | 351/110 |
| 7,182,458 B2 | 2/2007 | Ogren et al. | |
| 7,789,506 B1 * | 9/2010 | Kim | 351/110 |
| 2003/0076476 A1 | 4/2003 | Anger | |

FOREIGN PATENT DOCUMENTS

| | | |
|---|---|---|
| EP | 1024390 A1 | 2/2000 |
| EP | 1182489 A1 | 2/2002 |
| FR | 2880138 | 12/2004 |
| WO | WO 03/050595 A1 | 6/2003 |
| WO | WO 2005/083496 A1 | 9/2005 |

\* cited by examiner

*Primary Examiner* — Hung Dang

(74) *Attorney, Agent, or Firm* — William E. Pelton; Cooper & Dunham LLP

(57) ABSTRACT

A method for assembling a rimless spectacle has acts of forming multiple circular through holes in a lens of the rimless spectacle, forming two cavities respectively at two ends of a diameter of each through hole to form a non-circular connecting hole in the lens with a forming tool and assembling multiple connecting elements to the lens. Each connecting element has a plug securely connected to and held in one of the connecting holes in the lens. The plug has a non-circular cross section corresponding to the shape of the corresponding connecting hole and is slightly bigger than the corresponding connecting hole. In the assembling the connecting elements to the lens, the plug on each connecting element is forced to pressed into and be securely held in the corresponding connecting hole.

14 Claims, 10 Drawing Sheets

LENS CONNECTION DEVICE FOR AN EYEWEAR

BACKGROUND OF THE INVENTION

1. Field of the Invention

The present invention relates to a device that can connect a lens to another part of an eyewear, such as a bridge or a temple of a normal spectacle frame with or without rim, or an arm/bridge of a auxiliary spectacle without a temple, with or without rim, for clipping onto a normal spectacle to form a sunglasses or other similar auxiliary function.

2. Description of Related Art

There are many different kinds of lens connection devices to connect a pair of lens onto a bridge and two temples to form mostly a conventional rimless spectacle. A connection device must satisfy three conditions to become a usable lens connection device.

a) There is no relative movement between the connector and the lens.
   b) There is no relative rotational movement between the connector and the lens.
   c) Because the connection device located on the front of the spectacle, so for esthetic reason, the connector device has to be small in volume and occupy minimal area on the lens.

To fulfill the above conditions a) and b), the convention lens connection devices use two kinds of "Fixing methods".

Fixing Method A) Two Points Fixing:

The connection device has two fixing points at an interval, each point comprises a bolt or a pin engaged a hole in the lens and fixed by a nut to tighten on one side of the lens, or by a resilient bush being pressed into the gap between the pin and the lens hole, so that the head of the bolt or the flat surface of the nut abutting with the lens surface for the first case. The resilient force of the bush holding the pin against the inner wall of the lens hole for the second case can prevent relative movement but cannot prevent rotation. The second fixing point then only need to prevent rotational movement and may be the same structure as the first fixing point, such as U.S. Pat. No. 7,182,458, U.S. Pat. No. 5,450,141 and FR 2,880,138 or may be a point of contact between a pin on the connector and a slot at the lens edge near the first fixing point, such as the embodiment shown in FIG. 6 of U.S. Pat. No. 6,170,950, or may be a contact surface between a bracket on the connector that touch on the edge of the lens near the first point, such as the embodiment shown in FIGS. 19 and 20 of the '950 patent.

Fixing Method B) One Point Fixing:

This is an improved version of Method A) by eliminating the second fixing point of Method A) and using a non-circular plug on the connector to engage a non-circular orifice in the lens and to form a "form locking joint" to prevent relative rotation. When a direct contact is formed between the plug and the inner wall of the orifice, the joint is referred to as a "Direct Contact Form Locking Joint", such as EP 1,024,390 and WO 03/050595.

However, in the above two cases and in many other similar cases of the conventional lens connectors, which use a direct contact form locking joint, the joints are 100% in clearance or transitional fit but not in interference fit. Due to the fact of that the connecting hole production method now available is invariable the rotary cutting method, the inherent of this traditional production process (thin and overhanging cutter, feeding direction perpendicular to overhanging length, so generate big bending force) limit the capabilities of copying the plug's shape accurately. Such a mismatch in form between the connecting hole and the plug will cause lens crack unless enough tolerance is left between them. Therefore, the conventional connectors all adopt a Clearance Fit, or at best, a Transitional Fit. These kinds of fits do not have a surface contact and only have a line or point contact or clearance between the plug and the inner wall of the orifice, and this gives rise to relative movement or "shaking" between the plug and the lens.

To solve this shaking problem, there is another kind of form locking joint, which is same as the "direct contact form locking joint", except that a clearance between the connecting hole and the plug is deliberately maintained, a bush made of resilient material, and has the shape as the clearance but bigger, is forced in to fill up the clearance. The deformation of the resilient bush will exert a force to hold the plug firmly inside the connecting hole. This kind of joint will be refereed to as the Resilient Contact Form Locking Joint, such as US 2003/0076476, U.S. Pat. No. 5,659,380 and U.S. Pat. No. 5,450,141.

However, the conventional lens connectors of the "two points fixing" has disadvantages comparing to the "one point fixing" as follows: occupying bigger area on the lens and being more difficult to manufacture and to assemble because the two points has a separation which needs to match with the corresponding separation of the two pins on the connector.

The conventional "one point fixing" lens connectors, while being superior to the two points fixing, however, has the disadvantage of that the "resilient contact form locking" joint occupies big volume and lens area to cause the eyewear look ugly.

From the above analysis, the last kind of conventional joint, namely: the "one point fixing, direct contact form locking joint" seems to be the best one by the aforementioned three criteria, but it still has two shortcomings due to the limitation of the connecting hole production by the conventional rotary cutting methods, such as drilling followed by end milling using an end milling cutter or followed by grinding or milling using a circular grinding disc or a circular milling cutter, etc. In fact, all of the conventional lens connectors are using rotary cutting to cut the connecting hole, so all of the conventional lens connectors, either they are too bulky, such as the "two point fixing" or "one point fixing resilient contacting form locking" versions. The "one point fixing direct contact form locking" of conventional connector seems to be the best of all, but still has two shortcomings due to the limitation of the rotary cutting method to produce the connecting hole. If theses two shortcomings can be resolved, this "one point fixing direct contact form locking" connector may be the best one as judged by the aforementioned three criteria.

Three cases of the conventional "one point fixing, direct contact form locking" lens connectors are cited below to illustrate what the two shortcomings are.

In the EP '390 patent, the connecting hole is cut by drilling a hole through the lens, then use a circular disc cutter to cut an arc into the lens surface, so that a cavity is formed in the lens surface with an arc bottom, a rectangular opening and a through hole at the center of the opening passing through the bottom.

In the WO '595 patent, the connecting hole is cut by drilling a hole through the lens, then use a end milling cutter to cut the non circular shape on the lens surface with controlled depth.

In the U.S. '476 patent, the through hole in the lens is non-circular shaped and is cut by the same end milling cutter method as the WO '595 patent except that the cutting is passing through the lens thickness, but not in controlled depth. The above 3 cases and many other existing similar cases, whose connecting holes are produced by rotary cutters, all has the following two limitations.

A) Their connecting holes are still too big compare with the smallest form locking connecting hole (SFLCH), which should be a lens orifice limited only by the strength of the connecting element, but not by the lens orifice production method. The plug or the connecting element cannot be too small, otherwise it will break when in use. In the extreme case of minimum volume, the round segment is to directly fit the bridge or the end piece of a spectacle, (an end piece is a spectacle part that connect the temple to the front) the smallest possible bridge or end piece is 1.4 mm (millimeter) diameter wire. Therefore, an SFLCH should be a round segment with a cavity defined in its inner edge to make it non-circular. For maximum anti-rotational force per unit occupied lens area, the best shape of the cavity should be a rectangle slot with two right angled sharp corners running through the lens thickness, which is the same as the key slot found on a machine shaft and the driven wheel thereof. To maintain the circular shape of the round segment, the width of the slot cannot be bigger than 25% of the diameter of the round segment or 0.35 mm. To increase its anti-rotational strength and the aesthetic look, two such slots are formed respectively at the ends of the diameter of the round segment.

Therefore, a smallest form locking connecting hole (SFLCH) as derived from first principle comprises of a round segment defined through the lens and has an inner edge and a diameter of 1.4 mm. A cavity in a rectangular slot form 0.35 mm wide with right angled sharp corners flat bottom is formed in the inner edge of the round segment at each end of the diameter of the round segment, and running through the lens thickness to make the orifice non-circular.

The conventional rotary cutting method cannot produce such a SFLCH, because sharp corner cannot be formed, and the 0.35 mm width slot cannot be formed because that the smallest possible end milling cutter is of 0.8 mm diameter.

B) The conventional method to copy the cross sectional shape of the plug in the connecting hole is by programming the machining path to trace the shape of the plug, but serious error will occur due to 1) the actual shape of the plug deviated from the theoretically programmed shape, and 2) The machine error due to cutter bending etc will not make the shape of the connecting hole being the same as the programmed path. As a result, the connecting hole and the corresponding plug for all the above three cases and many other existing similar cases whose connecting holes are produced by rotary cutting, must be in transitional fit but cannot be in interference fit because the latter require that a precisely controlled amount of interference, and an exact conformity of shape to the cross section of the plug must be maintain when producing the connecting hole to avoid lens crack. However, such a loose fitting has only line or point contact between the plug and the inner wall of the orifice, this cannot lock against shaking. The solution to such shaking by the conventional lens connectors are using a clamping force generated by a bolt and nut passing through the lens's to exert on the two sides of the lens through one abutting surfaces on each side. However, the shake resistant force is the frictional force, which is only a fraction of the clamping force, stronger frictional force require bigger clamping force that may damage the lens, and the abutting surface itself will occupy lens area and affect the aesthetic appearance.

A rimless spectacle, as shown in FIG. 5, comprises two lenses 90, two temples 70, a nose bridge 80 and multiple connectors. Each lens 90 has two through holes 91 defined through the lens 90 respectively near two sides of the lens 90. The temples 70 and the nose bridge 80 are connected to the through holes 91 in the lenses 90 with the connectors. Each connector comprises a threaded rod 71,81 and a nut 72,82. The threaded rod 71,81 is securely attached to one of the temples 70 and nose bridge 80 and is mounted through a corresponding one of the through holes 91 in the lenses 90. The nut 72,82 is securely screwed with the threaded rod 71,81 and abuts against the lens 90 so as to securely connect the temple 70 or nose bridge 80 with the lens 90.

In an alternative embodiment as shown in FIG. 6, another conventional connector may comprise a resilient base 73 held in one of the through holes 91 and an inserting rod 71A formed on one of the temples 70A and the nose bridge and plugged into the resilient base 73. With the engagement between the inserting rod 71A and the resilient base 73, the temples 70A and nose bridge are connected securely with the lenses 90.

However, the conventional connectors shown in FIGS. 5 and 6 cannot prevent the temples 70,70A or nose bridge 80 from rotating relative to the lenses 90, the combination angle between the temples 70,70A or nose bridge 80 with the lenses 90 easily changes.

With reference to FIG. 7, another conventional connector is provided and comprises a threaded rod 71B, a nut 72B and a positioning rod 74. With the arrangement of the positioning rod 74, the temples 70B or nose bridge can be kept from rotating relative to the lens 90B, but a notch 92 should be formed in an edge of the lens 90B.

With reference to FIG. 8, an alternative embodiment of conventional connector may comprise two inserting rods 71C and a resilient connecting base 73C with two holes engaging respectively the inserting rods 71C.

However, the conventional connectors shown in FIGS. 7 and 8 have the following disadvantages.

1. Two through holes 91 or one through hole 91 with one notch 92 have to be formed in each side of the lens 90B,90C for combining with the temple 70B,70C or nose bridge, this takes a large space for defining the holes 91 or notch 92 in the lens 90B,90C.

2. The positions of the rods 71B,71C,74 have to be precisely aligned with the through holes 91 and notch 92, otherwise the temples 70B,70C or nose bridge cannot be connected to the lens 90B,90C.

With reference to FIGS. 9 and 10, a further conventional connector (EP1024390A1) comprises a threaded rod 71D and two positioning ribs 712 formed on two sides of the threaded rod 71D. A positioning groove 912 is defined in the lens 90 and communicates with the through hole 91 to correspond to the positioning ribs 712 on the threaded rod 71D. With the engagement between the positioning groove 912 and ribs 712, the temple 70D or nose bridge can be kept from rotating relative to the lens 90D.

However, the conventional connector shown in FIGS. 9 and 10 has the following shortcomings.

1. The height of the positioning ribs 712 and the depth of the positioning groove 912 should be large and deep enough, otherwise the engaging effect between the groove 912 and ribs 712 will lose. However, this will occupy larger lens area, and cause the volume of the lens 90D enlarged.

2. The shape of the positioning groove 912 in the lens 90D have to be precisely corresponding to that of the ribs 712, any mismatch will cause shaking or lens crack. As aforementioned, such a precise shape and size matching requirement on the groove is difficult to achieve by conventional rotary cutting method, and this causes difficulty for assembling a spectacle.

To overcome the shortcomings, the present invention tends to provide a method for assembling a spectacle to mitigate or obviate the aforementioned problems.

SUMMARY OF THE INVENTION

The main objective of the invention is to provide a method of assembling a rimless spectacle that is easily assembled.

The method for assembling a rimless spectacle has acts of forming multiple circular through holes in a lens of the rimless spectacle, forming two cavities respectively at two ends of a diameter of each through hole to form a non-circular connecting hole in the lens with a forming tool and assembling multiple connecting elements to the lens. Each connecting element has a plug securely connected to and held in one of the connecting holes in the lens. The plug has a non-circular cross section corresponding to the shape of the corresponding connecting hole and has a diameter larger than that of the through hole of the corresponding connecting hole. In the assembling the connecting elements to the lens, the plug on each connecting element is forced to pressed into and be securely held in the corresponding connecting hole.

Other objects, advantages and novel features of the invention will become more apparent from the following detailed description when taken in conjunction with the accompanying drawings.

DETAILED DESCRIPTION OF PREFERRED EMBODIMENT

The present invention is devised to solve the aforementioned shortcomings of the conventional lens connectors by using an innovative "Linear motion cutting" method, as in contrast to the conventional "rotary cutting" method, to produce the connecting hole with a specially designed forming tool as described following and to produce such an SFLCH easily including a very narrow 0.35 mm slot.

Figure 1:
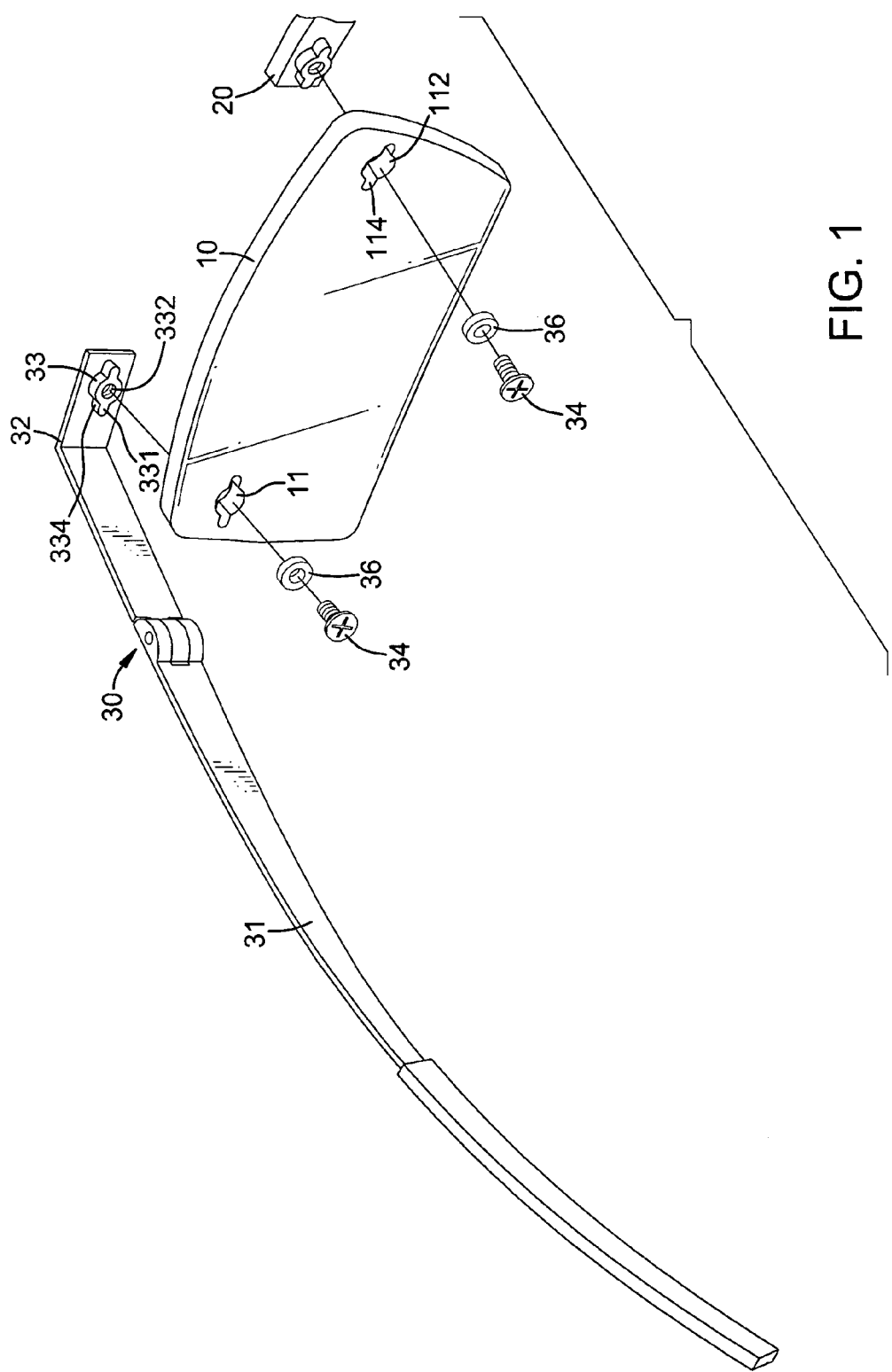
FIG. 1 is an exploded perspective view of a spectacle assembled by a method in accordance with the present invention.

With reference to FIG. 1, a rimless spectacle comprises a lens 10 and multiple connecting elements 30. The lens 10 has multiple non-circular connecting holes 11 defined through the lens 10 respectively near sides of the lens 10 and each having a shape. In a preferred embodiment, each connecting hole 11 in the lens 10 comprises a round segment 112 and two cavities 114. The round segment 112 is defined through the lens 10 and has an inner edge and a diameter. The cavities 114 are formed in the inner edge of the round segment 112 respectively at two ends of the diameter of the round segment 112 to make the connecting hole 11 non-circular.

Figure 2:
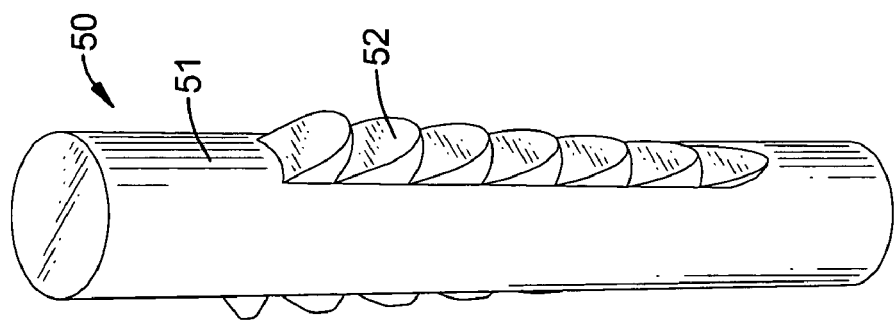
FIG. 2 is a perspective view of a forming tool for forming the connecting hole in a lens in FIG. 1.
Figure 4:
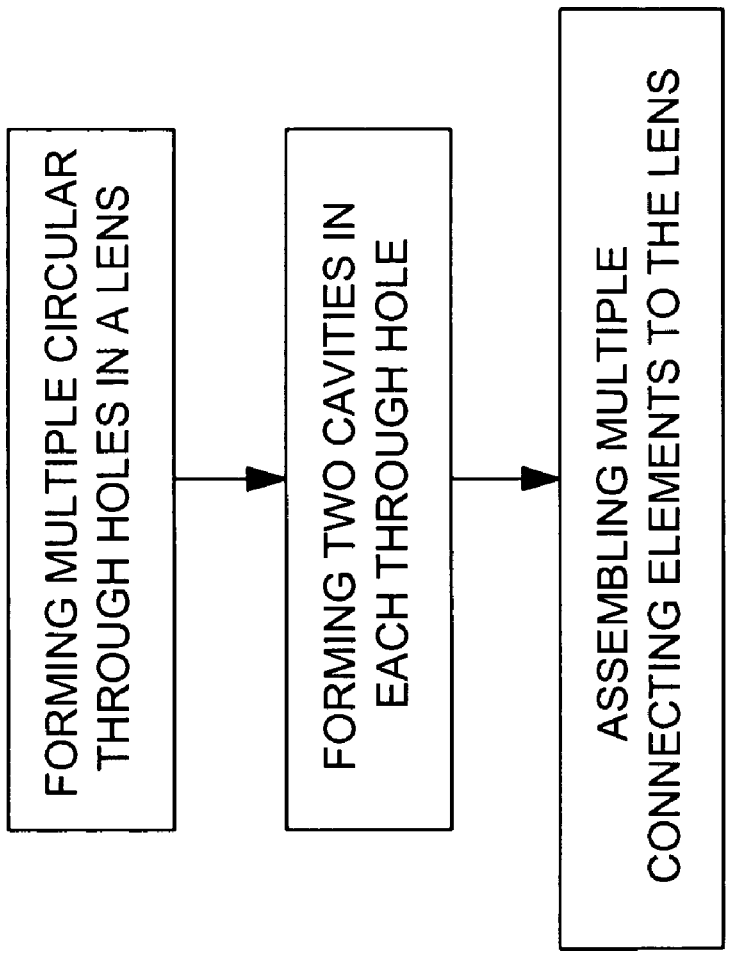
FIG. 4 is a block diagram of a method of assembling a spectacle in accordance with the present invention.
Figure 5:
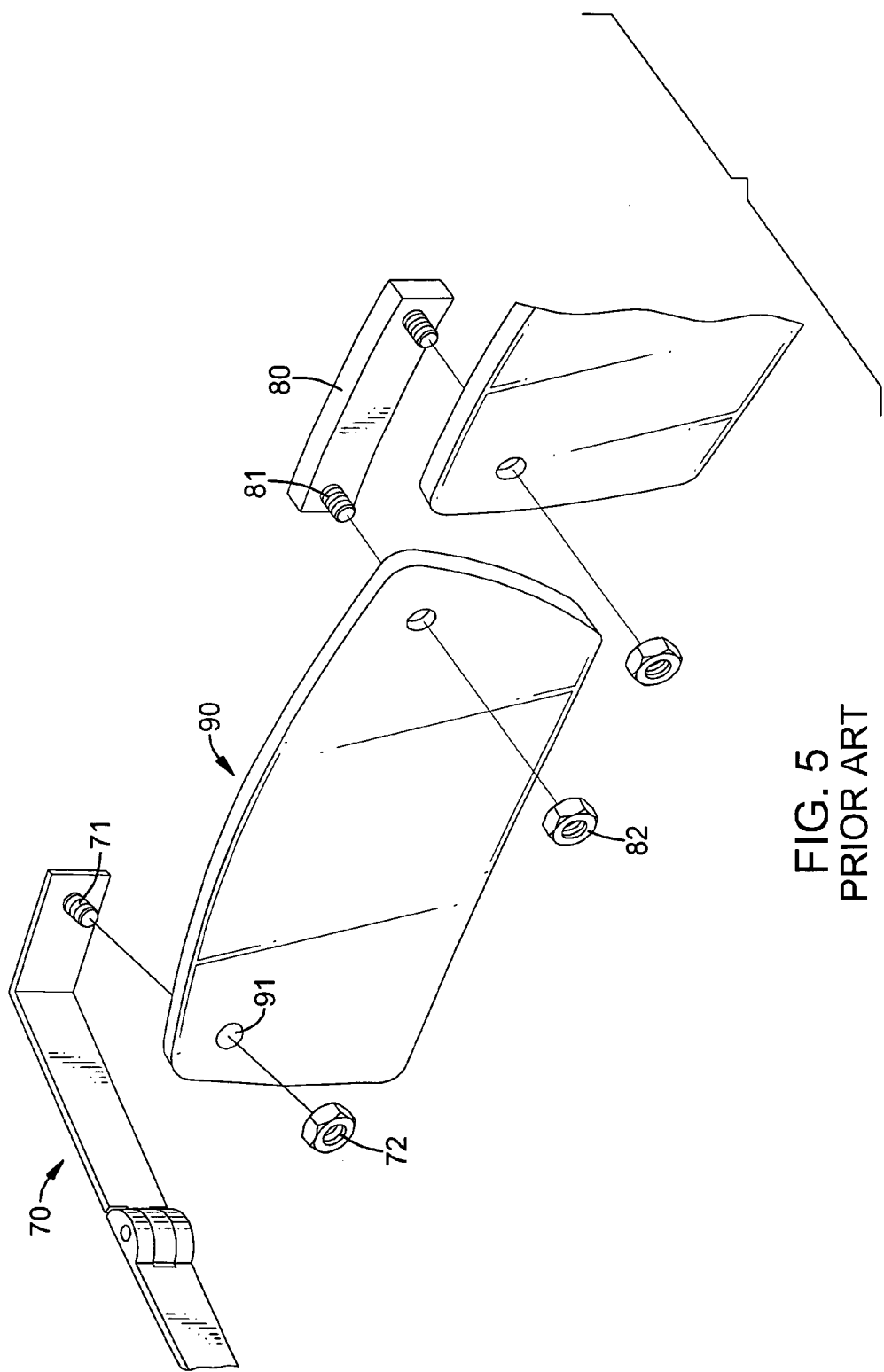
FIG. 5 is an exploded perspective view of a spectacle with conventional connectors in accordance with the prior art.
Figure 6:
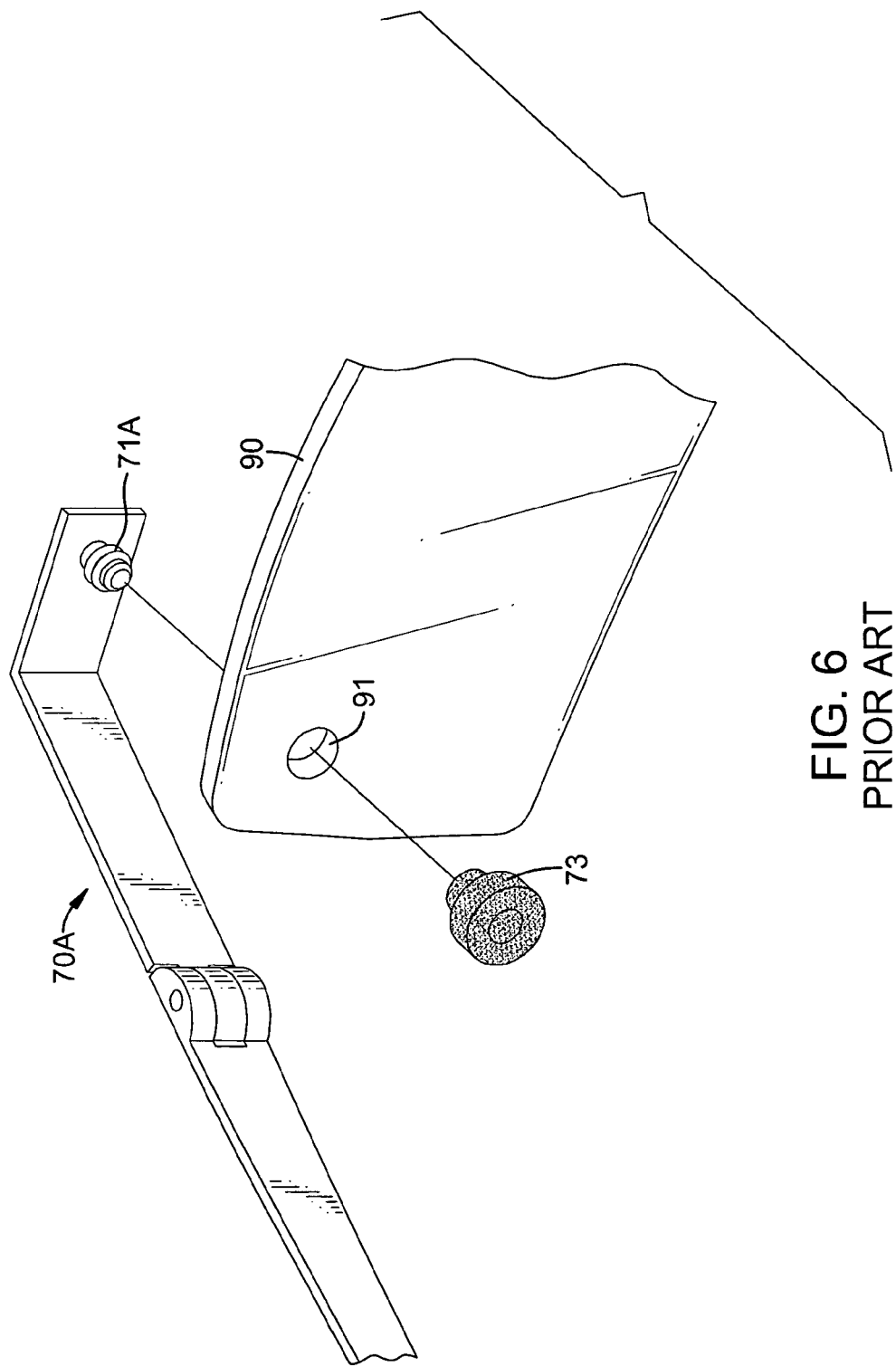
FIG. 6 an exploded perspective view of a lens with another conventional connector in accordance with the prior art.
Figure 7:
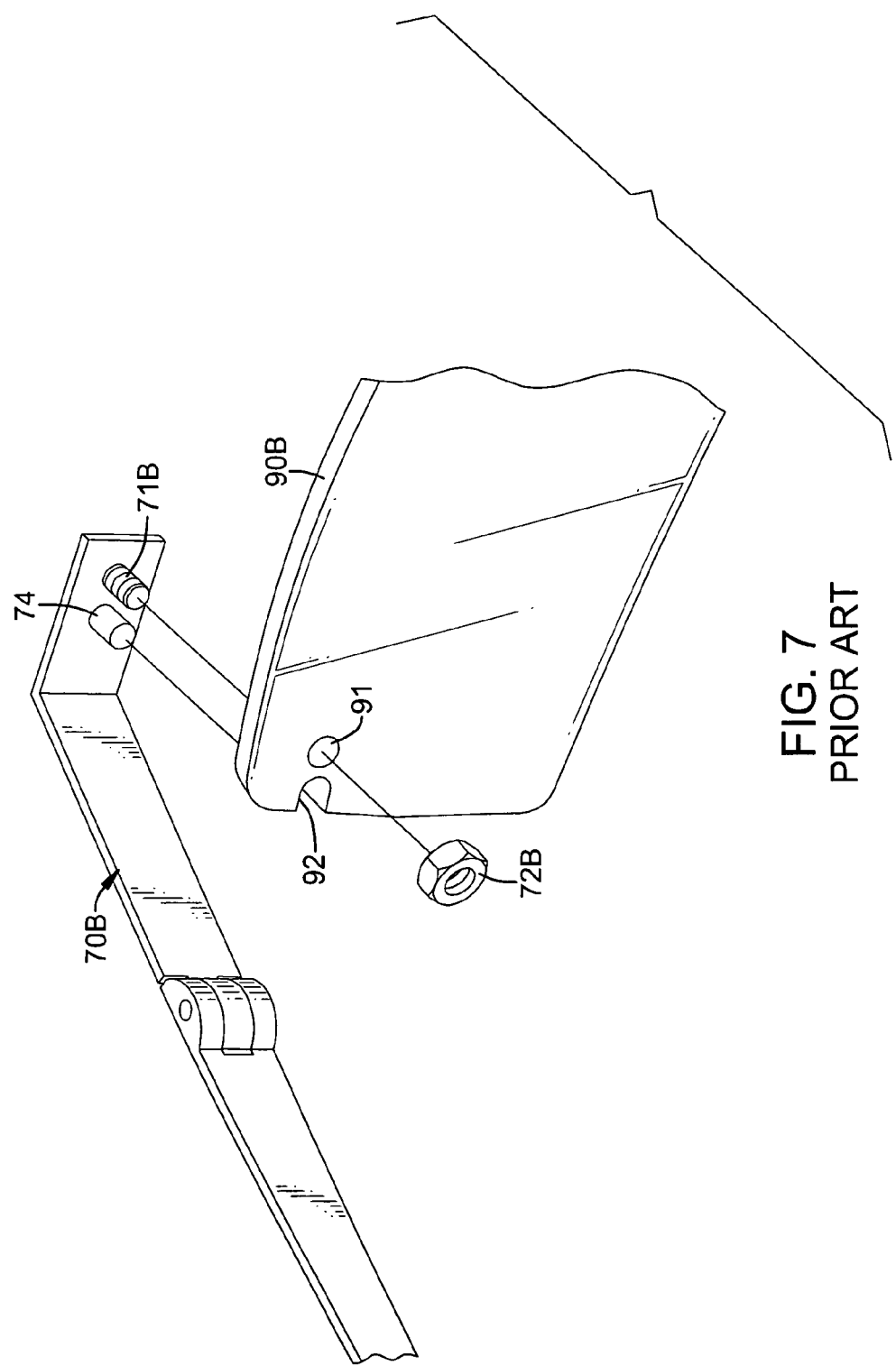
FIG. 7 an exploded perspective view of a lens with another conventional connector in accordance with the prior art.
Figure 8:
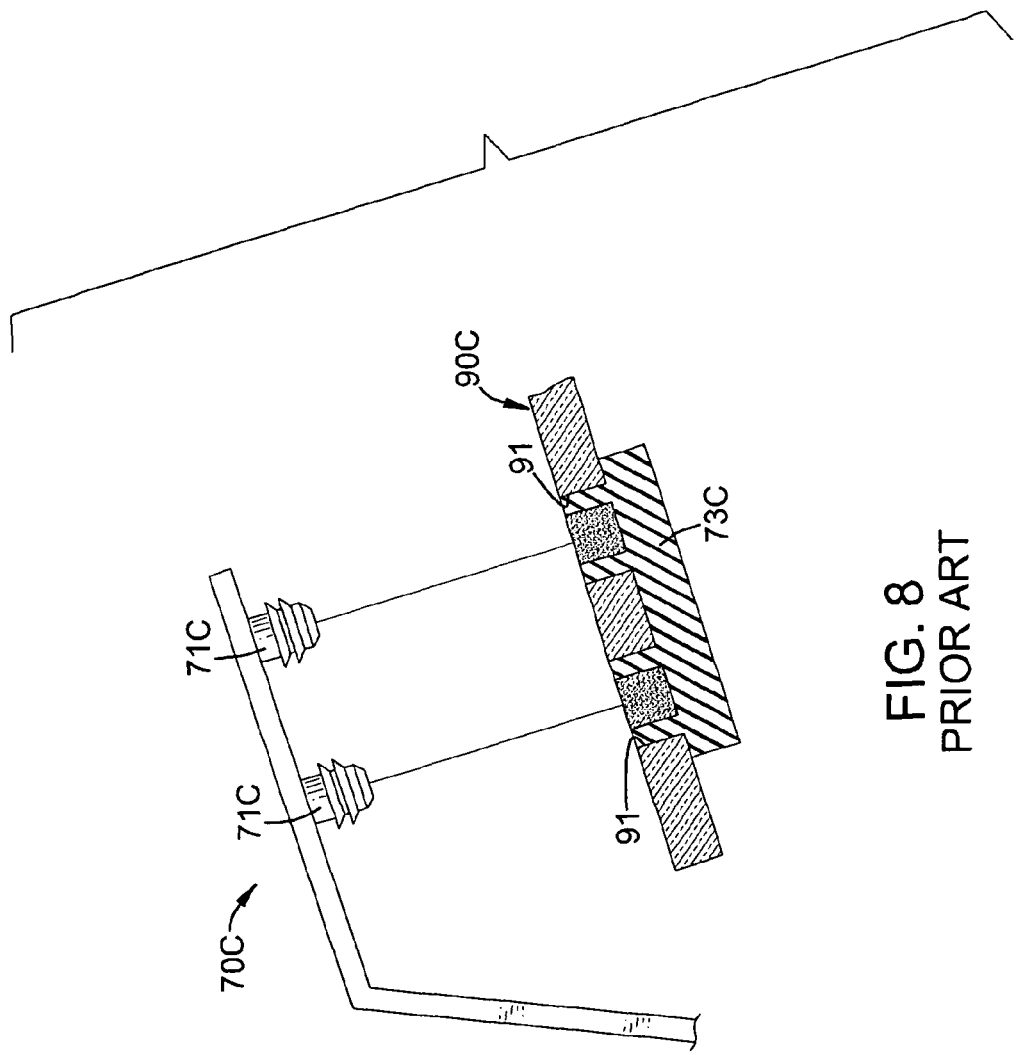
FIG. 8 an exploded top view in partial section of a lens with another conventional connector in accordance with the prior art.
Figure 9:
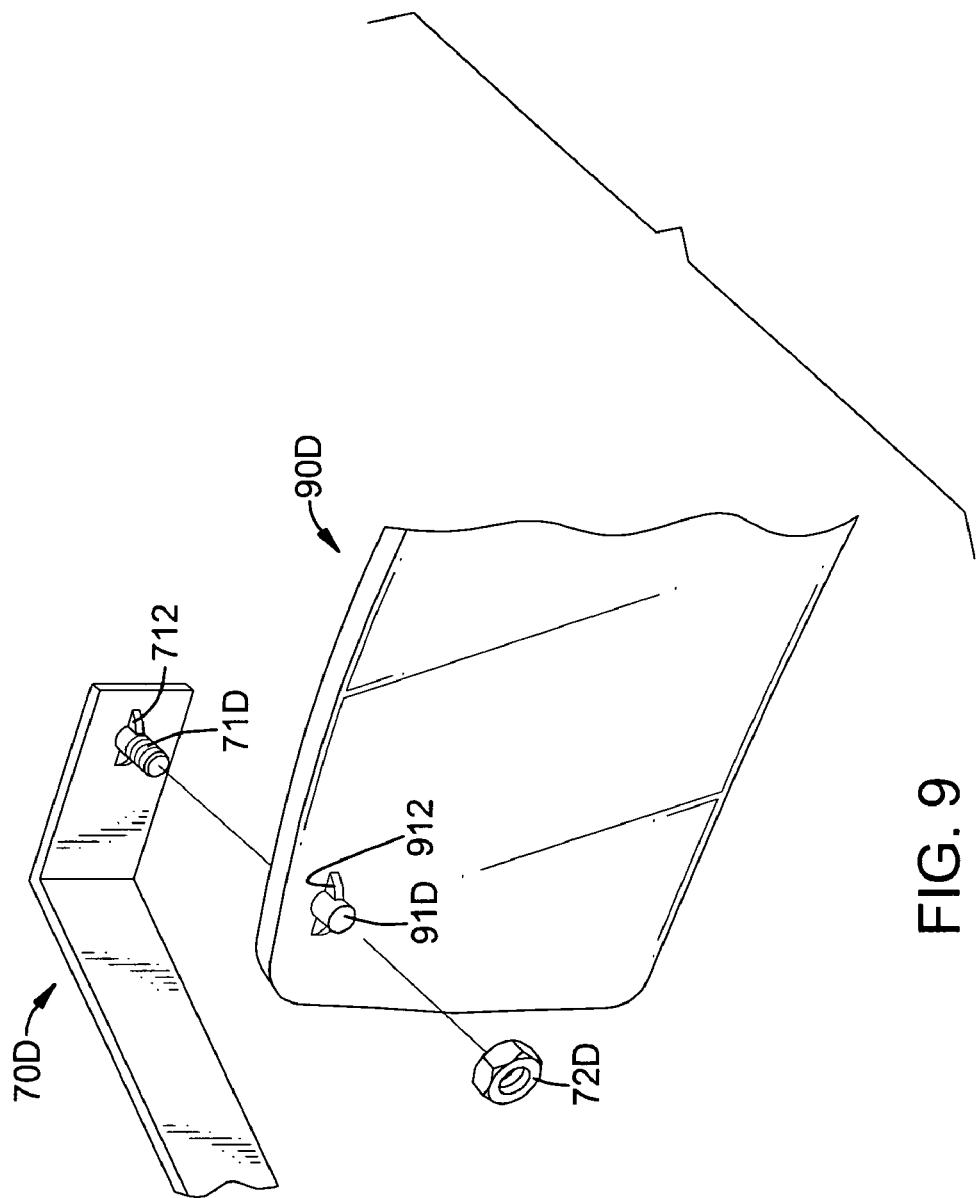
FIG. 9 an exploded perspective view of a lens with another conventional connector in accordance with the prior art.
Figure 10:
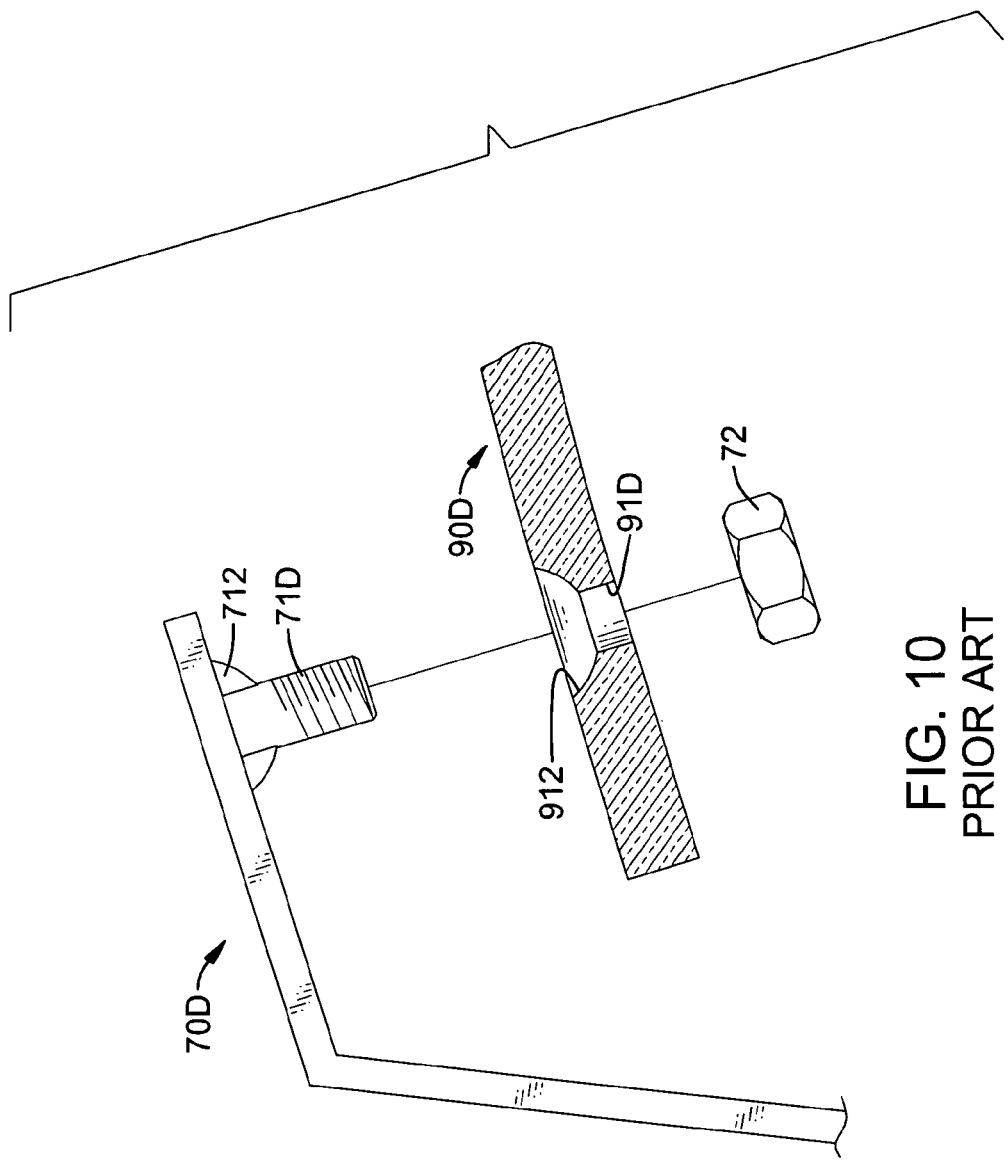
FIG. 10 an exploded top view in partial section of the lens with the conventional connector in FIG. 9.

With further reference to FIGS. 2 and 4, a forming tool 50 comprises a cylindrical rod 51 and multiple pair of cutting teeth 52. The cutting teeth 52 are formed on the cylindrical rod 51 in series and pairs and have different dimensions. To form a connecting hole 11 with two cavities 114 as shown in a lens 10, a circular through hole is firstly defined through the lens to form the round segment 112 of the connecting hole 11. The cylindrical rod 51 is inserted into the through hole and is pushed by a press to cut off the inner edge of the round hole to define the cavities 114 with the cutting teeth 52. Accordingly, the connecting hole 11 can be easily and conveniently defined in the lens 10 with the forming tool 50.

Each connecting element 30 is connected to the lens 10 and has a plug 33 securely connected to and held in the connecting hole 11 in the lens 10. The connecting element 30 may be a nose bridge 20 or a temple 31 of a spectacle. The plug 33 has a non-circular cross section corresponding to the shape of the connecting hole 11. In the preferred embodiment, the plug 33 of the connecting element 30 has two ears 331 formed on the plug 33 respectively corresponding to and held in the cavities 114 of the connecting hole 11 in the lens 10. The plug 33 of the connecting element 30 may further have a threaded hole 332 defined in a free end of the plug 33. A bolt 34 is screwed into the threaded hole 332 in the plug 33 and has a head abutting with the lens 10.

In a preferable embodiment, the connecting hole 11 has a dimension slightly smaller than that of the plug 33, and the plug 33 on the connecting element 30 has multiple sides larger than corresponding sides of the through hole of the corresponding connecting hole 11 in approximately 0.05 millimeter (mm). With the connecting hole 11 being slightly smaller than the plug 33, the plug 33 can be forced to press into and securely held in the connecting hole 11. With the non-circular shape of the connecting hole 11, the connecting element 30 with the plug 33 can be kept from rotating relative to the lens 10. Additionally, the bolt 34, by squeezing a resilient tube 36 into the space formed by the connecting hole 11 in the lens 10 and the plug 33, (in case of lens thicker than the plug length), the expansion of the tube 36 inside the space provide a further securing effect yet the bolt head need not be bigger than the round segment diameter of the lens 10, thus give a minimal and slim look.

In the first embodiment as shown in FIG. 1, the plug 33 is formed on a bent portion of a hinge 32 of the temple 31, and the bent portion of the hinge 32 is substantially parallel with the lens 10.

Figure 3:
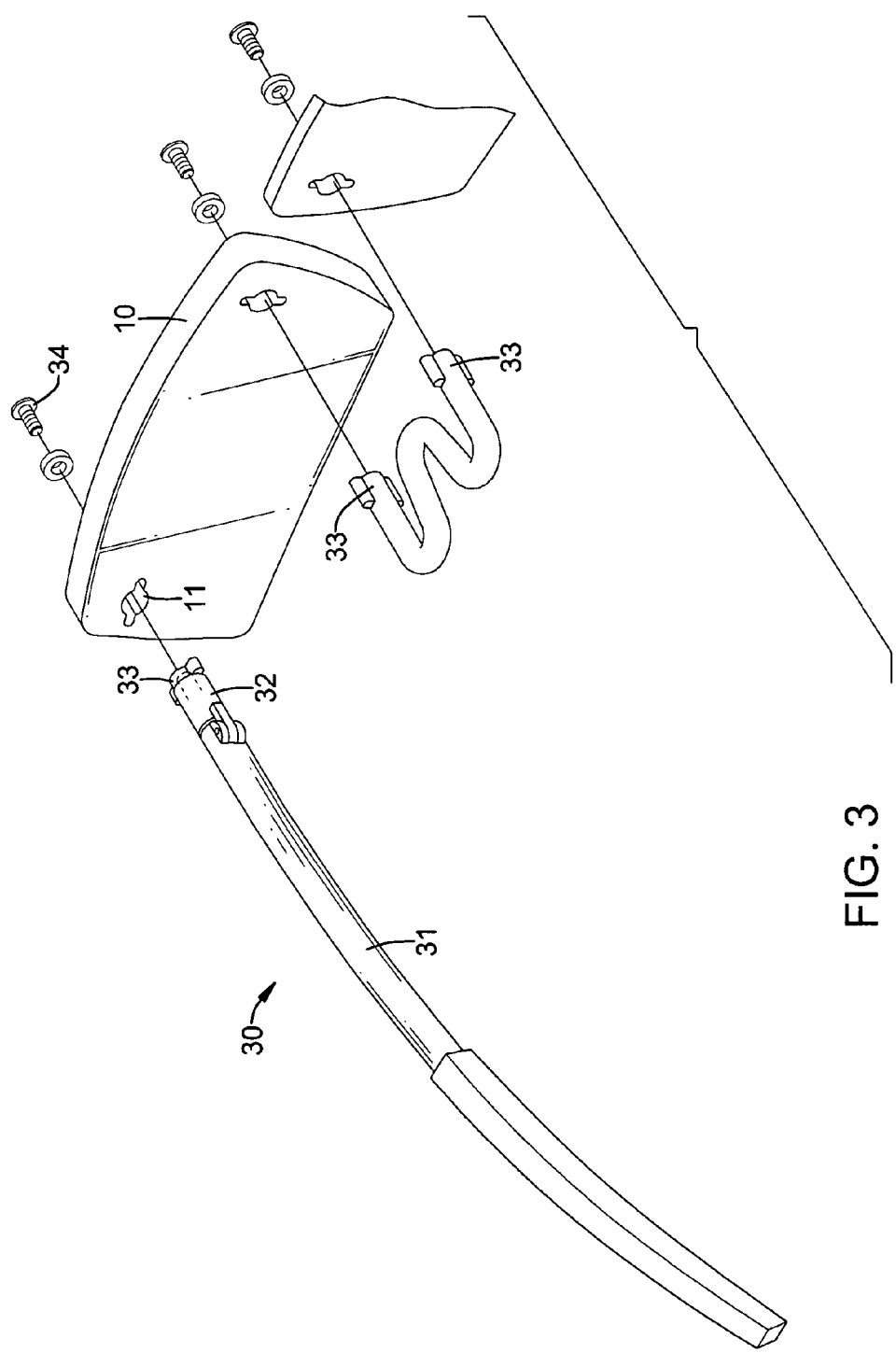
FIG. 3 is an exploded perspective view of another embodiment of a connecting device for a spectacle for the method in accordance with the present invention.

In a second embodiment as shown in FIG. 3, the plug 33 is formed on a free end of the end piece 32A, and the end piece 32A is substantially perpendicular to the lens 10, and similarly for the bridge In addition, the length of the plug 33 can be equal to or smaller than the depth of the connecting hole 11 in the lens 10 to make the plug 33 fitting with different lens having different thicknesses. A resilient tube 36 made of resin is inserted into the space left inside the connecting hole 11, and being squeezed to expand inside the space by the bolt 34 to provide a further securing effect.

To assemble the plug 33 with the connecting hole 11, a guiding device with a threaded rod is firstly inserted through the round segment 112 of the connecting hole 11 and is screwed into the threaded hole 332 in the plug 33. With the rotation of the guiding device, the plug 33 is pulled and inserted into the connecting hole 11 to make the plug 33 with the ears 331 securely held in the connecting hole 11. With the secure abutment and engagement of the outer surface of the plug 33 and the inner surface of the connecting hole 11, the plug 33 is securely held in and connecting with the connecting hole 11 without the bolt 34.

Accordingly, the method in accordance with the present invention can copy the cross sectional shape of the plug 33 by a brand new concept of that the shape of the plug 33 is not traced and then cut in the lens by rotary cutter to form the connecting hole 11 indirectly, but is cut directly in the lens by using the special forming tool as shown in FIG. 2 and that the cross sectional shape of the forming tool 50 is exactly same as that of the plug 33. Therefore, the forming tool 50 acts as a template and duplicates exactly the same shape in the connecting hole 11. To ensure the cross sectional shape of the plug 33 is exactly as the forming tool 50 but bigger by a precisely controlled amount, the plug 33 is manufactured by the same production method as the forming tool, such as both can be produced by electric discharge wire cutting machine or by extrusion machine.

With reference to FIG. 1, a connection device for a rimless spectacle in accordance with the present invention a lens 10 and a connecting element 30. The lens 10 has a non circular connecting hole 11, which takes on a special shape called the "SMALLEST FORM LOCKING LENS CONNECTING HOLE" (SFLLH) and comprises a round segment 112 and a cavity 114. The round segment 112 defined through the lens 10 and has an inner edge and a diameter. The cavity 114 is in a form of a narrow rectangular slot not wider than 0.7 millimeter (mm) with two sharp corners and a flat bottom formed in the inner edge of the round segment 112 and passes all the way through a thickness of the lens 10 at each end of the diameter of the round segment 112.

The connecting element 30 has a plug 33 that has the same cross sectional shape as that of but being slightly bigger than the connecting hole 11, is forcibly pulled into the connecting hole 11 by a pulling device to form an interference fit joint with the connecting hole 11. Preferably, the SFLLH is cut by a special forming tool 50 as shown in FIG. 2. Alternatively, the slot's bottom can assume any other geometric shape than a flat bottom, such as a round bottom etc., by changing the shape of the cutting teeth of the forming tool 50. The slot is cut with the forming tool 50 by a linear motion cutting as in contrast to the conventional rotary cutting method. The plug 33 of the connecting element 30 has the same cross sectional shape as and is a little bigger than the connecting hole 11 so as to form an interference fit joint with the connecting hole 11. The plug 33 of the connecting element 30 further has a threaded hole 332 defined in a free end of the plug 33 for pulling it forcibly into the smaller connecting hole 11. A bolt 34 with a small decoration head is screwed into the threaded hole 332 to cover the threaded hole 332 up after assembly.

In addition, a resilient tube 36 having an inner diameter equal to the bolt 34, an outer diameter equal to the diameter of the round segment 112 is inserted into the space formed by the connecting hole and the plug, and is squeezed to expand inside the space by tightening the bolt 34.

Furthermore, a specially designed puller is used as a tool, whose retractable rod after engaging the threaded hole 332 in the plug 33 can retract to pull the plug 33 into the smaller connecting hole 11.

In addition, the connecting element can be a nose bridge of a spectacle, an auxiliary frame, such as a clip-on sunglasses, a temple of a spectacle or an arm of an auxiliary frame, such as a clip-on sunglasses.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A method for assembling a rimless spectacle comprising acts of:
   forming multiple circular through holes in a lens of the rimless spectacle;
   forming two cavities respectively at two ends of a diameter of each through hole to form a non-circular connecting hole in the lens with a forming tool; and
   assembling multiple connecting elements to the lens, wherein
   each connecting element has a plug securely connected to and held in one of the connecting holes in the lens and having a non-circular cross section corresponding to the shape of the corresponding connecting hole;
   the connecting hole has a dimension slightly smaller than that of the plug; and
   in the assembling the connecting elements to the lens, the plug on each connecting element is forced to pressed into and be securely held in the corresponding connecting hole.

2. The method as claimed in claim 1, wherein in the act of forming two cavities, the forming tool comprises
   a cylindrical rod; and
   multiple pairs of cutting teeth form on the cylindrical rod in series and having different dimensions; and
   the act of forming two cavities in a through hole comprises acts of:
   inserting the forming tool in the through hole; and
   pushing the forming tool into the through hole to cut off an inner edge of the through hole to form the cavities with the cutting teeth.

3. The method as claimed in claim 2, wherein act of assembling each connecting element to the lens comprising acts of:
   inserting a guiding device having a threaded rod into the through hole of one of the connecting holes;
   screwing the threaded rod of the guiding device into a threaded hole defined in the plug of the connecting element; and
   rotating the guiding device to pull and force the plug into the connecting hole in the lens.

4. The method as claimed in claim 3, wherein the plug on each connecting element has multiple sides larger than corresponding sides of the through hole of the corresponding connecting hole in approximately 0.05 millimeter (mm).

5. The method as claimed in claim 1, wherein act of assembling each connecting element to the lens comprising acts of:
   inserting a guiding device having a threaded rod into the through hole of one of the connecting holes;
   screwing the threaded rod of the guiding device into a threaded hole defined in the plug of the connecting element; and
   rotating the guiding device to pull and force the plug into the connecting hole in the lens.

6. The method as claimed in claim 5, wherein the plug on each connecting element has multiple sides larger than corresponding sides of the through hole of the corresponding connecting hole in approximately 0.05 millimeter (mm).

7. The method as claimed in claim 1, wherein the plug on each connecting element has multiple sides larger than corresponding sides of the through hole of the corresponding connecting hole in approximately 0.05 millimeter (mm).

8. A connection device for a rimless spectacle comprising:

a lens having a non circular connecting hole and comprising a round segment defined through the lens and having an inner edge and a diameter;

a cavity in a form of a narrow rectangular slot not wider than 0.7 millimeter (mm) with two sharp corners and a flat bottom formed in the inner edge of the round segment and passing all the way through a thickness of the lens at each end of the diameter of the round segment; and a connecting element having a plug that has the same cross sectional shape as that of but being slightly bigger than the connecting hole, being forcibly pulled into the connecting hole by a pulling device to form an interference fit joint with the connecting hole.

9. The connection device as claimed in claim 8, wherein the plug of the connecting element further has a threaded hole defined in a free end of the plug for pulling it forcibly into the connecting hole.

10. The connection device as claimed in claim 9 further comprising a bolt with a head screwed into the threaded hole to cover the threaded hole.

11. The connection device as claimed in claim 10, wherein a resilient tube is inserted to fill up the space between the connecting hole, the plug, and the bolt before tightening, and is made to expand inside the space by tightening the bolt.

12. The connection device as claimed in claim 10, wherein the connecting element is a nose bridge of a spectacle.

13. The connection device as claimed in claim 10, wherein the connecting element is an end piece of a spectacle.

14. The connection device as claimed in claim 10, wherein the connecting element is an arm of an auxiliary frame.

* * * * *